(12) United States Patent
Huang et al.

(10) Patent No.: US 11,150,433 B2
(45) Date of Patent: Oct. 19, 2021

(54) IMAGING LENS ASSEMBLY, CAMERA MODULE AND ELECTRONIC DEVICE

(71) Applicant: LARGAN PRECISION CO., LTD., Taichung (TW)

(72) Inventors: Yeo-Chih Huang, Taichung (TW); Chun-Hua Tsai, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 210 days.

(21) Appl. No.: 16/400,062

(22) Filed: May 1, 2019

(65) Prior Publication Data
US 2020/0057234 A1   Feb. 20, 2020

(30) Foreign Application Priority Data

Aug. 17, 2018  (TW) .................................. 107128863

(51) Int. Cl.
*G02B 7/02*    (2021.01)

(52) U.S. Cl.
CPC .................................... *G02B 7/021* (2013.01)

(58) Field of Classification Search
CPC .......... G02B 7/02; G02B 7/021; G02B 7/025; G02B 7/022; G02B 7/026; G02B 7/023; G02B 7/003; G02B 7/04; G02B 13/001; G02B 7/08; G02B 23/2476; G02B 27/62; G02B 3/00; G02B 13/004; G02B 13/0045; G02B 3/0075; G02B 5/003; G02B 5/005; G02B 13/0035; G02B 13/0085; G03B 17/12; G03B 17/14; G03B 3/10; G03B 17/02; G03B 21/142; G03B 21/145; G03B 21/28; G03B 11/045; G03B 13/36; G03B 17/08; G03B 17/17; G03B 17/55; G03B 19/023; G03B 21/005; G03B 21/10; G03B 21/2013; G03B 21/2033; G03B 21/2066; G03B 21/208; G03B 2205/00; H04N 5/2254; H04N 5/2257; H04N 5/2253; H04N 5/2252; H04N 1/113; H04N 2005/2255; H04N 5/2256; H04N 5/2259; H04N 5/23293

See application file for complete search history.

(56) References Cited

U.S. PATENT DOCUMENTS

| | | | |
|---|---|---|---|
| 2016/0178874 A1* | 6/2016 | Kim | G02B 7/021 359/738 |
| 2017/0023764 A1* | 1/2017 | Chou | G02B 7/09 |
| 2017/0075109 A1* | 3/2017 | Chou | G02B 5/208 |
| 2017/0131513 A1* | 5/2017 | Lin | G02B 7/021 |
| 2018/0307000 A1* | 10/2018 | Lai | G02B 7/021 |

* cited by examiner

*Primary Examiner* — William R Alexander
*Assistant Examiner* — Sharrief I Broome
(74) *Attorney, Agent, or Firm* — McClure, Qualey & Rodack, LLP

(57) ABSTRACT

An imaging lens assembly includes a plastic barrel and a lens element set. The lens element set is disposed in the plastic barrel and has an optical axis. The lens element set includes an object-side lens element and an image-side lens element. The object-side lens element has an outer diameter surface and an optical effective portion, and includes a conical-aligning surface located on an image-side surface of the object-side lens element and for coaxially aligning and connecting the image-side lens element.

26 Claims, 17 Drawing Sheets

IMAGING LENS ASSEMBLY, CAMERA MODULE AND ELECTRONIC DEVICE

RELATED APPLICATIONS

This application claims priority to Taiwan Application Serial No. 107128863, filed Aug. 17, 2018, which is herein incorporated by reference.

BACKGROUND

Technical Field

The present disclosure relates to an imaging lens assembly and a camera module. More particularly, the present disclosure relates to an imaging lens assembly and a camera module applicable to a portable electronic device.

Description of Related Art

In recent years, the portable electronic devices have been developed rapidly, such as smart devices, tablets and so on. These portable electronic devices have been full of daily lives of modern people, and the imaging lens assembly loaded on the portable electronic devices thrives on it. The demand for quality of the imaging lens assembly increases along with the advances in technology. Therefore, the imaging lens assembly needs to be improved not only on the quality of the optical design but manufacturing assembling precision.

During the process of the manufacturing and assembly of the imaging lens assembly, the assembling and the image quality of the imaging lens assembly are affected by the relative disposition between the barrel and the lens elements and between the lens elements each other. The connecting structure is disposed on the lens element for cooperating with other lens element or the barrel so that the stray light is generated during imaging to affect the image quality. Therefore, development of a kind of the imaging lens assembly that combines assembling stability and image quality has been the goal of the related industries.

SUMMARY

According to one aspect of the present disclosure, an imaging lens assembly includes a plastic barrel and a lens element set. The lens element set is disposed in the plastic barrel and has an optical axis. The lens element set includes an object-side lens element and an image-side lens element. The object-side lens element has an outer diameter surface and an optical effective portion. The object-side lens element includes a conical-aligning surface located on an image-side surface of the object-side lens element and for coaxially aligning and connecting the image-side lens element. When a minimum radial distance between a position of a minimum diameter of the conical-aligning surface and the outer diameter surface is L1, the following condition is satisfied: 0.03 mm<L1<0.28 mm.

According to another aspect of the present disclosure, a camera module includes the imaging lens assembly according to the aforementioned aspect.

According to another aspect of the present disclosure, an electronic device includes the camera module according to the aforementioned aspect and an image sensor. The image sensor is disposed on an image surface of the camera module.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
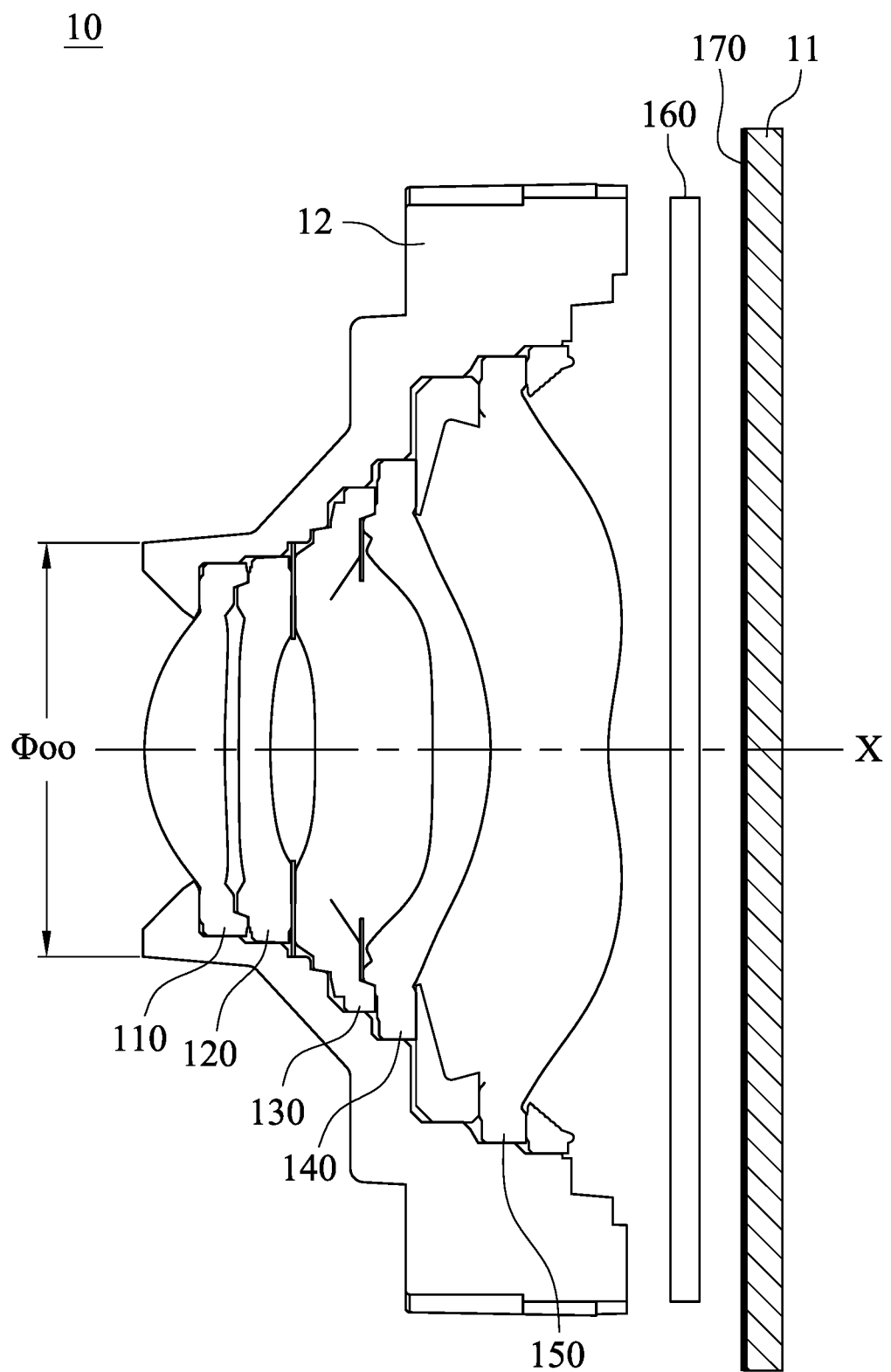
FIG. 1A is a schematic view of an electronic device according to the 1st embodiment of the present disclosure.

An imaging lens assembly includes a plastic barrel and a lens element set. The lens element set is disposed in the plastic barrel, wherein the lens element set has an optical axis and includes at least one object-side lens element and at least one image-side lens element. The object-side lens element is correspondingly connected to the adjacent image-side lens element.

The object-side lens element has an outer diameter surface and an optical effective portion, and includes a conical-aligning surface. The conical-aligning surface is located on an image-side surface of the object-side lens element and for coaxially aligning and connecting the image-side lens element. When a minimum radial distance between a position of a minimum diameter of the conical-aligning surface and the outer diameter surface is L1, the following condition is satisfied: 0.03 mm<L1<0.28 mm. Therefore, the present disclosure provides a design and a manufacturing method of the lens element which obtains both of assembling stability and image quality, and it is favorable for ensuring the optical coaxiality of the lens element set by arranging the conical-aligning surface on the lens element. The present disclosure develops the object-side lens element satisfying the condition of L1 through massive optical path simulation and variety of assembling tester so as to effectively control the surface reflection of stray light inside the object-side lens element. When the value of L1 is too large, the image quality would be affected by excessive stray light reflected back to the image surface from the conical-aligning surface; when the value of L1 is too small, it is easily to generate the unacceptable deviation of the optical coaxiality of the lens element set due to the stability of the lens element set which is easily affected by the external force. Furthermore, the following condition can be satisfied: 0.03 mm<L1≤0.23 mm. Therefore, the value of L1 can be more precisely configured so as to obtain a more ideal suppression of stray light.

The object-side lens element can further include an image-side receiving surface, and the image-side lens element can include an object-side receiving surface, wherein the image-side receiving surface is connected with the object-side receiving surface, and the image-side receiving surface is farther from the optical effective portion than the conical-aligning surface is from the optical effective portion. In detail, both of the image-side receiving surface and the object-side receiving surface are mainly extended along the direction perpendicular to the optical axis, which is for connecting the adjacent image-side receiving surface and object-side receiving surface to each other, so that the image quality and the assembling stability can be maintained.

The object-side lens element can further include a parting line having an annular step mark surrounding the optical effective portion, wherein the parting line is located between the outer diameter surface and the image-side receiving surface. By the arrangement of the parting line, the dimensional accuracy of the object-side lens element can be increased.

The object-side lens element can further include an annular recess structure located between the outer diameter surface and the conical-aligning surface. When a recess depth of the annular recess structure parallel to the optical axis is s1, the following condition can be satisfied: s1<0.015 mm. Therefore, it is favorable for effectively reducing the common burr interference of the lens element by arranging the tiny annular recess structure with the aforementioned parameter L1, so that the assembling stability can be obtained, and the unexpected influence of the image quality can be avoided by preventing stray light affected by the burr interference. Furthermore, the following condition can be satisfied: s1<0.01 mm.

The image-side lens element can include a first recess structure facing the annular recess structure of the object-side lens element. When the recess depth of the annular recess structure parallel to the optical axis is s1, and a recess depth of the first recess structure parallel to the optical axis is s2, the following condition can be satisfied: 0.005 mm<s1+s2<0.035 mm. Therefore, the corresponding recess structures are disposed both on the object-side lens element and the image-side lens element, the structural interference can be reduced during the assembling process, and the aforementioned parameter L1 can be maintained in the proper range. Further, the following condition can be satisfied: 0.005 mm<s1+s2<0.02 mm. Moreover, the following condition can be satisfied: s1<s2. Therefore, the structural interference can be further improved.

When a minimum radial distance between the position of the minimum diameter of the conical-aligning surface and the optical effective portion is L0, the following condition can be satisfied: 0.2 mm<L0. Therefore, the parameter L0 can be maintained in the specific value range, so that the reflection situation of non-imaging light inside the object-side lens element can be controlled, and the sufficient space can be provided for adding other light blocking sheets on demand. If the value of the parameter L0 is too small, the non-imaging light of higher intensity would directly pass through the conical-aligning surface and directly result in the unrecoverable light pollution.

When an outer diameter of the plastic barrel closest to the object end is φoo, the following condition can be satisfied: 1.05 mm<φoo<3.05 mm. Therefore, the blocking effect of stray light outside the lens element can be enhanced with the arrangement of the aforementioned parameter L1.

When an angle between the conical-aligning surface and the optical axis is θ, the following condition can be satisfied: 2 degrees<θ<30 degrees. Therefore, the assembling stability and the image quality can be increased. The assembling stability would be worse due to the reflection of stray light getting serious by the arrangement with excessive angle; the coaxiality of the optical axis would be not easy to correct with too small angle, so that the displacement of optical axis which is unable to correct would exist.

In the conventional art, the assembling method is to assemble the lens elements of the lens element set and then dispose into the plastic barrel so as to ensure the precision of the coaxiality of the optical axis, however, the conventional assembling method is more difficult and complicated. In the imaging lens assembly of the present disclosure, the outer diameter surface of the object-side lens element can be directly contacted with the plastic barrel. By the direct contacting arrangement between the object-side lens element and the plastic barrel, the object-side lens element is assembled into the plastic barrel first so that only the acceptable displacing error between the plastic barrel and other lens elements would exist, and thereby the following lens elements are not be affected by the aforementioned displacement.

Moreover, the lens element set can include at least four lens elements. The at least four lens elements include the object-side lens element and the image-side lens element, wherein a lens element closest to the image end has a thickness, the thickness changes from small to large and then to small at a center of the lens element to an edge. Therefore, total reflection caused by stray light inside the aforementioned lens element can be effectively removed.

Each of the aforementioned features of the imaging lens assembly can be utilized in various combinations for achieving the corresponding effects.

According to another aspect of the present disclosure, a camera module includes the aforementioned imaging lens assembly. Therefore, the camera module with both image quality and assembling stability is provided.

According to another aspect of the present disclosure, an electronic device includes the aforementioned camera module and an image sensor, wherein the image sensor is disposed on the image surface of the camera module. Therefore, the electronic device with both image quality and assembling stability is provided.

Furthermore, when a pixel size of the image sensor of the aforementioned electronic device is p, the following condition can be satisfied: 0.1 um<p<0.95 um. Therefore, the optical performance with high quality and the slight light effect can be entirely reflected by the finer pixel size, and the features related to the parameter L1 after being improved can be performed by the better image sensor.

According to the above description of the present disclosure, the following specific embodiments are provided for further explanation.

1st Embodiment

FIG. 1A shows a schematic view of an electronic device 10 according to the 1st embodiment of the present disclosure. In FIG. 1A, the electronic device 10 includes a camera module (its reference numeral is omitted) and an image sensor 11, wherein the image sensor 11 is disposed on an image surface 170 of the camera module. The camera module includes an imaging lens assembly (its reference numeral is omitted). The imaging lens assembly includes a plastic barrel 12, a lens element set (its reference numeral is omitted) and a filter 160, wherein the lens element set is disposed in the plastic barrel 12, and the filter 160 is disposed on the image end of the plastic barrel 12. The lens element set has an optical axis X and includes at least four lens elements. In the 1st embodiment, the lens element set includes five lens elements, which are, from the object end to the image end, a first lens element, a second lens element, a third lens element 130, a fourth lens element 140 and a fifth lens element 150, wherein the first lens element is an object-side lens element 110, and the second lens element is an image-side lens element 120.

Figure 1B:
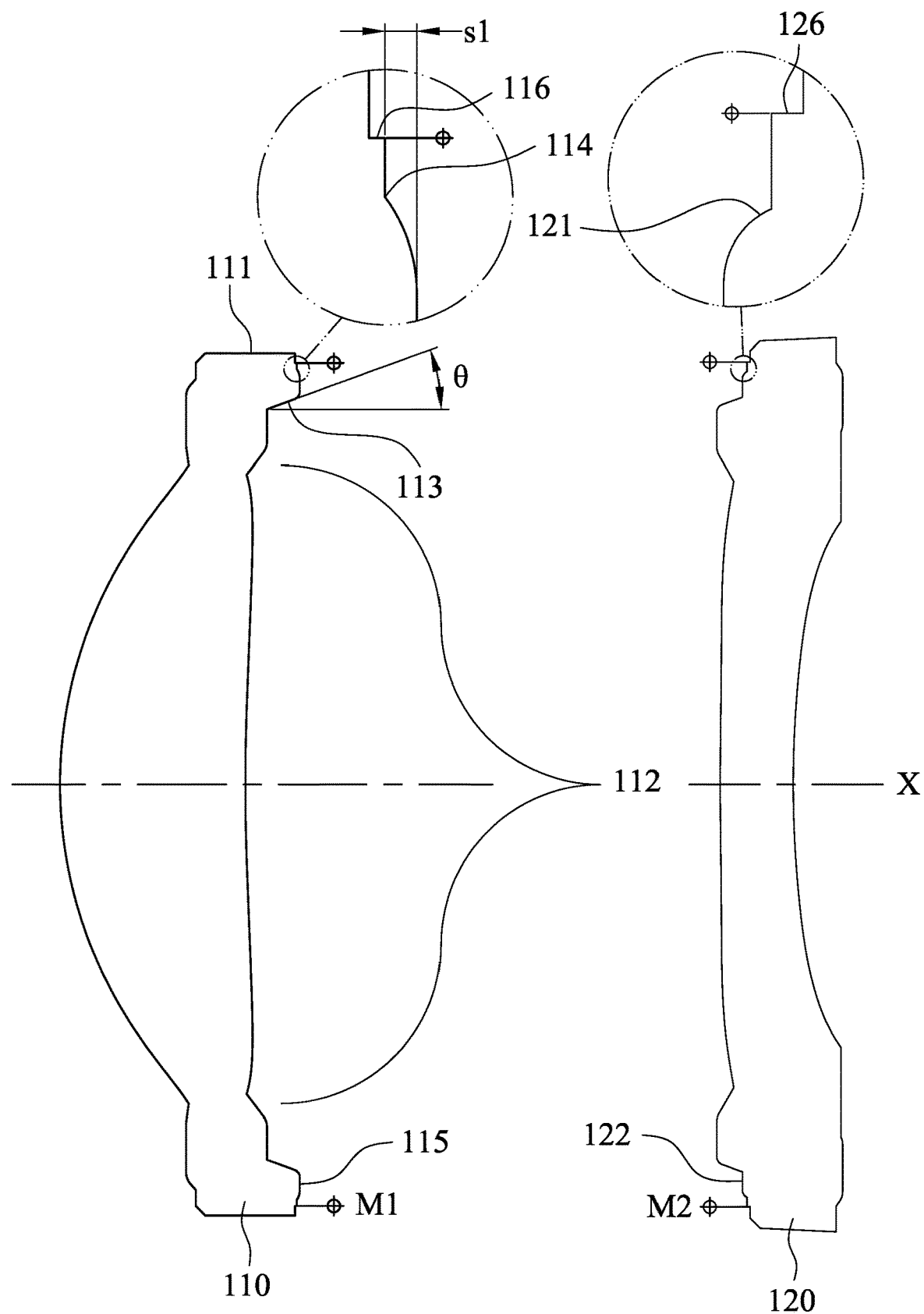
FIG. 1B is a schematic view of the object-side lens element and the image-side lens element of the electronic device according to the 1st embodiment of FIG. 1A.
Figure 1C:
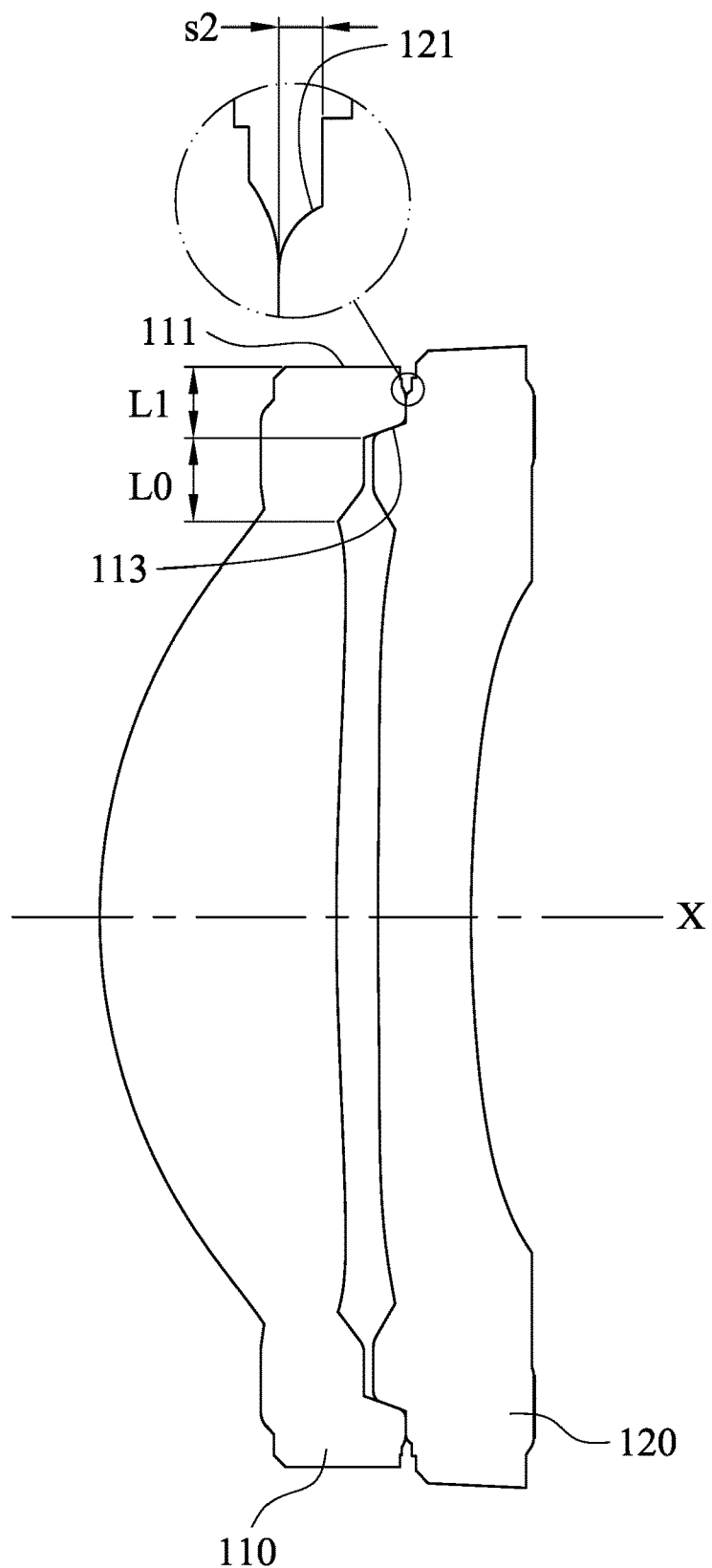
FIG. 1O is a schematic view of the connecting situation of the object-side lens element and the image-side lens element of the electronic device according to the 1st embodiment of FIG. 1A.

FIG. 1B shows a schematic view of the object-side lens element 110 and the image-side lens element 120 of the electronic device 10 according to the 1st embodiment of FIG. 1A. FIG. 1C shows a schematic view of the connecting situation of the object-side lens element 110 and the image-side lens element 120 of the electronic device 10 according to the 1st embodiment of FIG. 1A. In FIGS. 1B and 10, the object-side lens element 110 and the image-side lens element 120 are connected with each other, and no lens element is disposed between the object-side lens element 110 and the image-side lens element 120. Furthermore, the lens element closest to the image end of the five lens elements (in the 1st embodiment, which is the fifth lens element 150) has a thickness, and the thickness changes from small to large and then to small at a center of the lens element to an edge.

In detail, the object-side lens element 110 has an outer diameter surface 111 and an optical effective portion 112, wherein the outer diameter surface 111 is farther from the optical axis X than the optical effective portion 112 is from the optical axis X, and the outer diameter surface 111 of the object-side lens element 110 is directly contacted with the plastic barrel 12. The object-side lens element 110 includes a conical-aligning surface 113 and an annular recess structure 114, wherein the conical-aligning surface 113 can be disposed between the outer diameter surface 111 and the optical effective portion 112, and the annular recess structure 114 is located between the outer diameter surface 111 and the conical-aligning surface 113. The conical-aligning surface 113 is located on an image-side surface (its reference numeral is omitted) of the object-side lens element 110 and for coaxially aligning and connecting the image-side lens element 120, wherein the conical-aligning surface 113 tapers toward the object end of the object-side lens element 110 along a direction from the outer diameter surface 111 to the optical effective portion 112. That is, a shrinking structure from the outer diameter surface 111 to the optical effective portion 112 is formed on the image-side surface of the object-side lens element 110 by the conical-aligning surface 113. Moreover, the conical-aligning surface 113 is a smooth circular surface.

The image-side lens element 120 includes a first recess structure 121 facing the annular recess structure 114 of the object-side lens element 110, and a recess structure is formed on the position which is the annular recess structure 114 of the object-side lens element 110 corresponding to the first recess structure 121 of the image-side lens element 120.

Moreover, the object-side lens element 110 can further include an image-side receiving surface 115, and the image-side lens element 120 can further include an object-side receiving surface 122, wherein the image-side receiving surface 115 is connected with the object-side receiving surface 122, and the image-side receiving surface 115 is farther from the optical effective portion 112 than the conical-aligning surface 113 is from the optical effective portion 112. Therefore, the image quality and the assembling stability can be maintained.

In FIG. 1B, the object-side lens element 110 can further include a parting line 116 having an annular step mark (the reference numeral is omitted) surrounding the optical effective portion 112, wherein the parting line 116 is located between the outer diameter surface 111 and the image-side receiving surface 115. In FIG. 1B, the object-side lens element 110 and the image-side lens element 120 have demolding positions M1 and M2, respectively. The demolding positions M1 and M2 represent the marks of the demolding positions of the object-side lens element 110 and the image-side lens element 120, and indicate the corresponding injection spaces formed by the moldings with different structures. In detail, during the manufacturing process of the plastic lens element (that is, the object-side lens element 110), the surface step mark between the moldings is remained on the object-side lens element 110 when the moldings is separated at the demolding step according to the molding design, and the surface step mark is the parting line 116. The parting line 116 is farther from the image-side receiving surface 115 than the annular recess structure 114 is from the image-side receiving surface 115, that is, the annular recess structure 114 is located between the parting line 116 and the image-side receiving surface 115. The parting line 116 is farther from the conical-aligning surface 113 than the annular recess structure 114 is from the conical-aligning surface 113, that is, the annular recess structure 114 is located between the parting line 116 and the conical-aligning surface 113. The parting line 116 is farther from the conical-aligning surface 113 than the image-side receiving surface 115 is from the conical-aligning surface 113, that is, the image-side receiving surface 115 is located between the parting line 116 and the conical-aligning surface 113. Furthermore, the image-side lens element 120 can further include a parting line 126 having an annular step mark (its reference numeral is omitted).

According to the 1st embodiment in FIGS. 1A, 1B and 10, a minimum radial distance between a position of a minimum diameter of the conical-aligning surface 113 and the outer diameter surface 111 is L1, which is the distance vertical to the optical axis X between the position of the minimum diameter of the conical-aligning surface 113 and the outer diameter surface 111. A minimum radial distance between the position of the minimum diameter of the conical-aligning surface 113 and the optical effective portion 112 is L0, which is the distance vertical to the optical axis X between the minimum diameter of the conical-aligning surface 113 and the optical effective portion 112. A recess depth of the annular recess structure 114 parallel to the optical axis X is s1. A recess depth of the first recess structure 121 parallel to the optical axis X is s2. An angle between the conical-aligning surface 113 and the optical axis X is θ. The outer diameter of the plastic barrel 12 closest to the object end is φoo. The pixel size of the image sensor 11 is p. The aforementioned parameters are satisfied the conditions listed in the following Table 1.

TABLE 1 the 1st embodiment

| L1 (mm) | 0.175 | s1 + s2 (mm) | 0.025 |
|---|---|---|---|
| L0 (mm) | 0.205 | θ (degree) | 20 |
| s1 (mm) | 0.01 | Φoo (mm) | 2.999 |
| s2 (mm) | 0.015 | p (um) | 0.8 |

2nd Embodiment

Figure 2A:
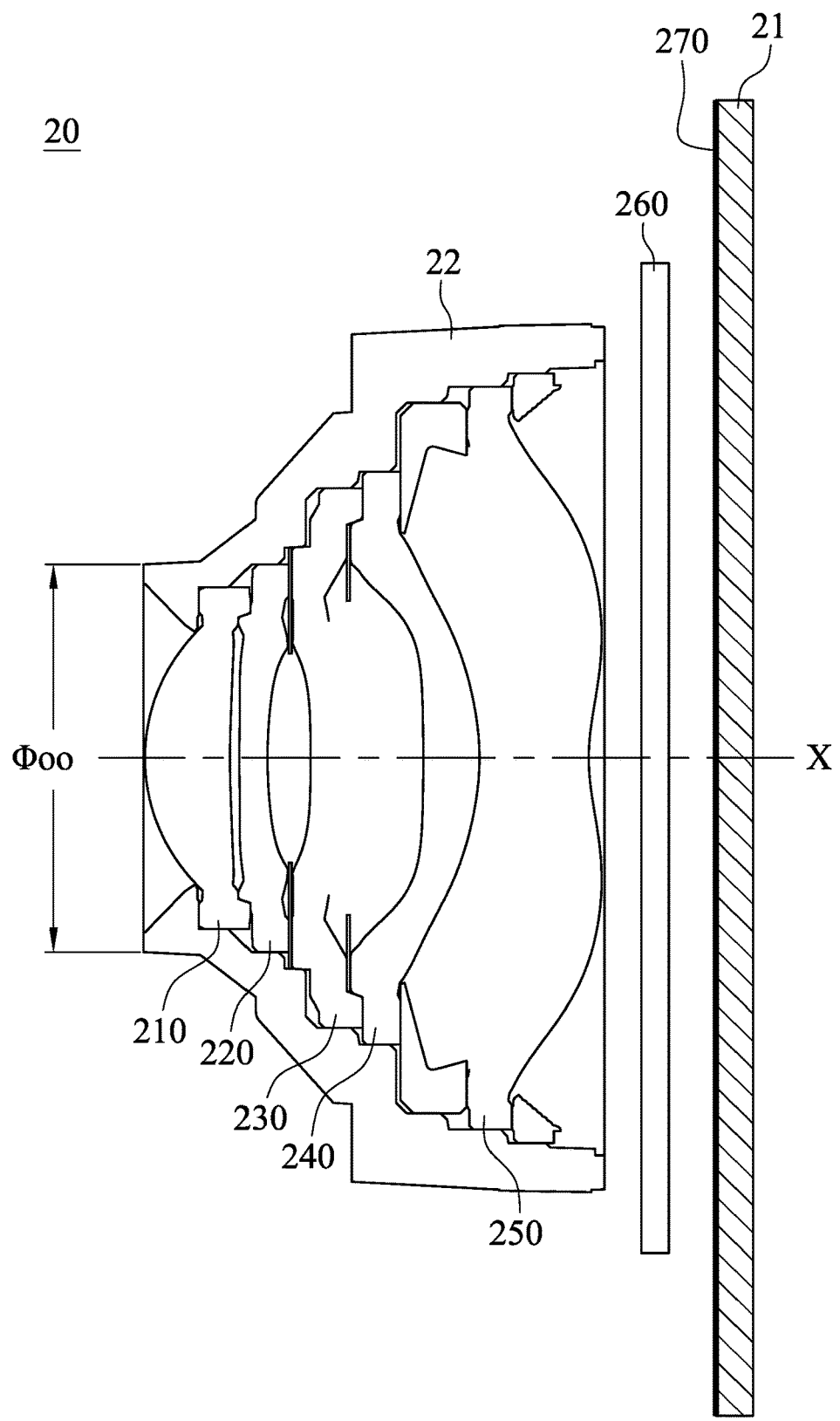
FIG. 2A is a schematic view of an electronic device according to the 2nd embodiment.

FIG. 2A shows a schematic view of an electronic device 20 according to the 2nd embodiment of the present disclosure. In FIG. 2A, the electronic device 20 includes a camera module (its reference numeral is omitted) and an image sensor 21, wherein the image sensor 21 is disposed on an image surface 270 of the camera module. The camera module includes an imaging lens assembly (its reference numeral is omitted). The imaging lens assembly includes a plastic barrel 22, a lens element set (its reference numeral is omitted) and a filter 260, wherein the lens element set is disposed in the plastic barrel 22, and the filter 260 is disposed on the image end of the plastic barrel 22. The lens element set has an optical axis X and includes at least four lens elements. In the 2nd embodiment, the lens element set includes five lens elements, which are, from the object end to the image end, a first lens element, a second lens element, a third lens element 230, a fourth lens element 240 and a fifth lens element 250, wherein the first lens element is an object-side lens element 210, and the second lens element is an image-side lens element 220.

Figure 2B:
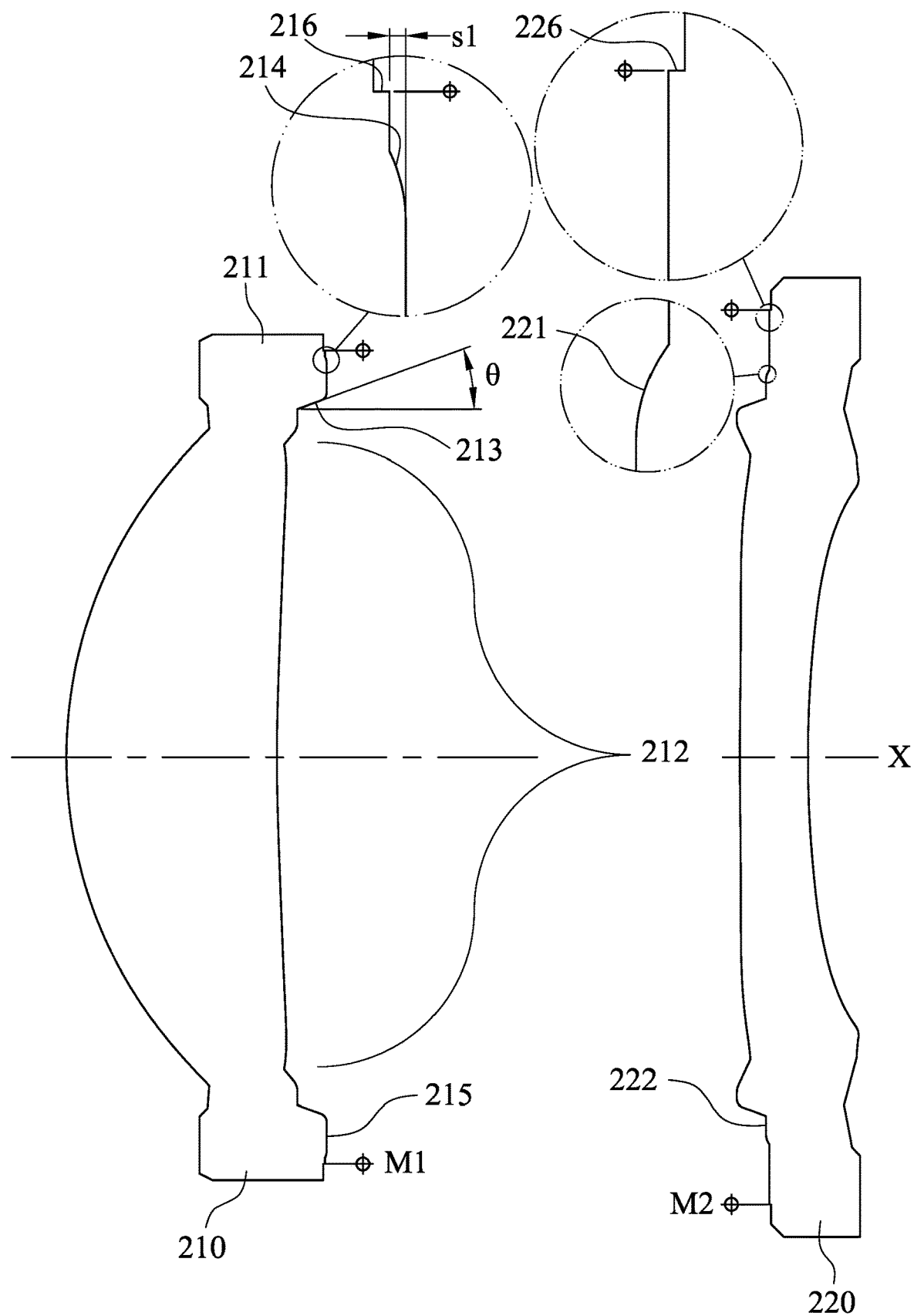
FIG. 2B is a schematic view of the object-side lens element and the image-side lens element of the electronic device according to the 2nd embodiment of FIG. 2A.
Figure 2C:
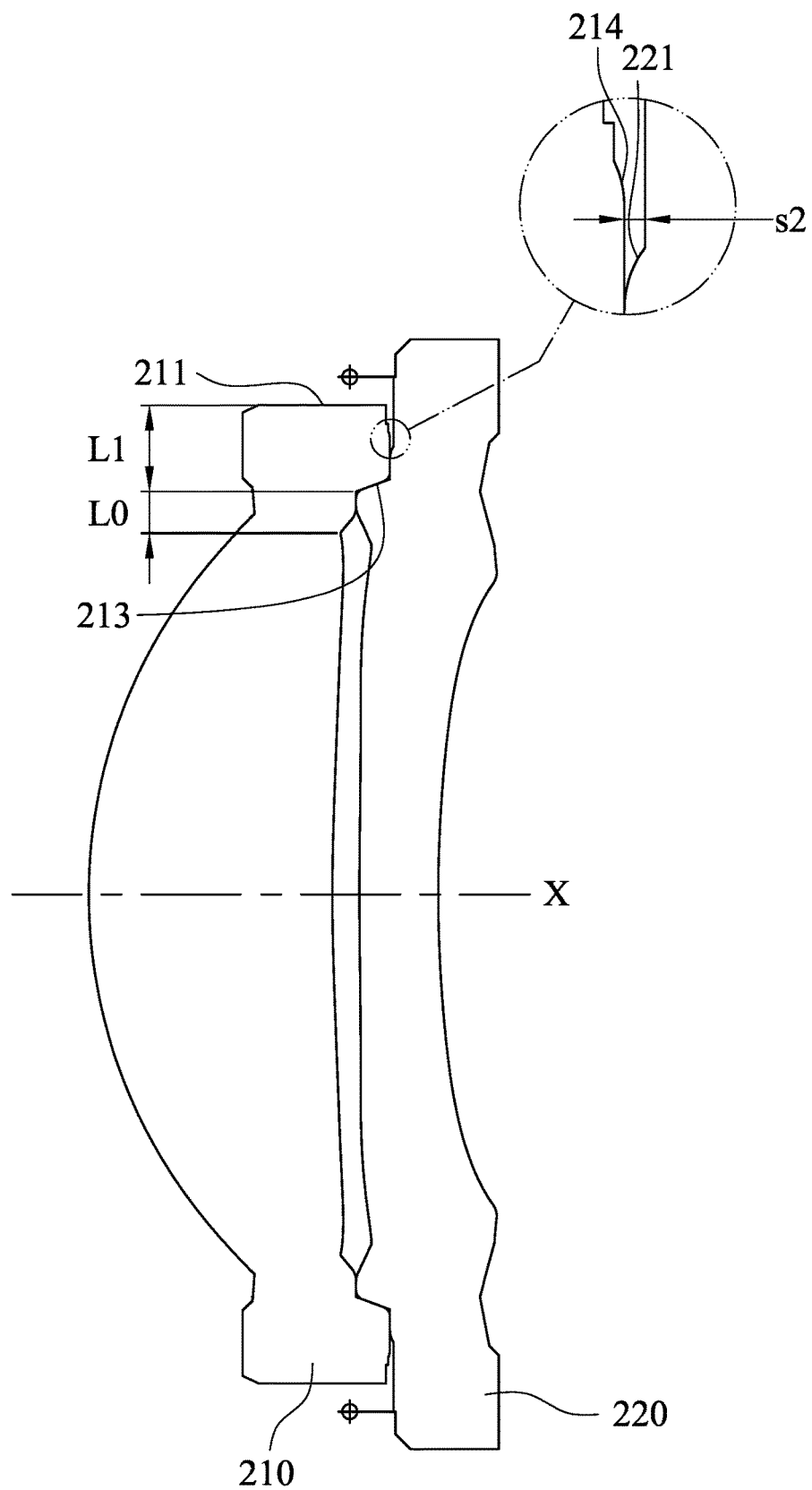
FIG. 2C is a schematic view of the connecting situation of the object-side lens element and the image-side lens element of the electronic device according to the 2nd embodiment of FIG. 2A.

FIG. 2B shows a schematic view of the object-side lens element 210 and the image-side lens element 220 of the electronic device 20 according to the 2nd embodiment of FIG. 2A, and FIG. 2C shows a schematic view of the connecting situation of the object-side lens element 210 and the image-side lens element 220 of the electronic device 20 according to the 2nd embodiment of FIG. 2A. In FIGS. 2B and 2C, the object-side lens element 210 and the image-side lens element 220 are connected with each other, and no lens element is disposed between the object-side lens element 210 and the image-side lens element 220. Furthermore, the lens element closest to the image end of the five lens elements (in the 2nd embodiment, which is the fifth lens element 250) has a thickness, and the thickness changes from small to large and then to small at a center of the lens element to an edge.

In detail, the object-side lens element 210 has an outer diameter surface 211 and an optical effective portion 212, wherein the outer diameter surface 211 is farther from the optical axis X than the optical effective portion 212 is from the optical axis X, and the outer diameter surface 211 of the object-side lens element 210 is directly contacted with the plastic barrel 22. The object-side lens element 210 includes a conical-aligning surface 213 and an annular recess structure 214, wherein the conical-aligning surface 213 can be disposed between the outer diameter surface 211 and the optical effective portion 212, and the annular recess structure 214 is located between the outer diameter surface 211 and the conical-aligning surface 213. The conical-aligning surface 213 is located on an image-side surface (its reference numeral is omitted) of the object-side lens element 210 and for coaxially aligning and connecting the image-side lens element 220. The conical-aligning surface 213 tapers toward the object end of the object-side lens element 210 along a direction from the outer diameter surface 211 to the optical effective portion 212. That is, a shrinking structure from the outer diameter surface 211 to the optical effective portion 212 is formed on the image-side surface of the object-side lens element 210 by the conical-aligning surface 213. Moreover, the conical-aligning surface 213 is a smooth circular surface.

The image-side lens element 220 includes a first recess structure 221 facing the annular recess structure 214 of the object-side lens element 210, and a recess structure is formed on the position which is the annular recess structure 214 of the object-side lens element 210 corresponding to the first recess structure 221 of the image-side lens element 220.

Moreover, the object-side lens element 210 can further include an image-side receiving surface 215, and the image-side lens element 220 can further include an object-side receiving surface 222, wherein the image-side receiving surface 215 is connected with the object-side receiving surface 222, and the image-side receiving surface 215 is farther from the optical effective portion 212 than the conical-aligning surface 213 is from the optical effective portion 212. Therefore, the image quality and the assembling stability can be maintained.

According to FIG. 2B, the object-side lens element 210 can further include a parting line 216 having an annular step mark (its reference numeral is omitted) surrounding the optical effective portion 212, wherein the parting line 216 is located between the outer diameter surface 211 and the image-side receiving surface 215. In the 2nd embodiment, the disposing arrangement of the parting line 216 and other structures of the object-side lens element 210 is the same as the 1st embodiment, and will not be described again herein. Furthermore, the image-side lens element 220 can further include a parting line 226 having an annular step mark (its reference numeral is omitted).

According to FIGS. 2A, 2B and 2C, and the definitions of the parameters of the Table 2 is the same as the 1st embodiment, and will not be described again herein.

TABLE 2 the 2nd embodiment

| L1 (mm) | 0.23 | s1 + s2 (mm) | 0.015 |
|---|---|---|---|
| L0 (mm) | 0.11 | θ (degree) | 20 |
| s1 (mm) | 0.005 | Φoo (mm) | 2.95 |
| s2 (mm) | 0.01 | p (um) | 0.8 |

3rd Embodiment

Figure 3A:
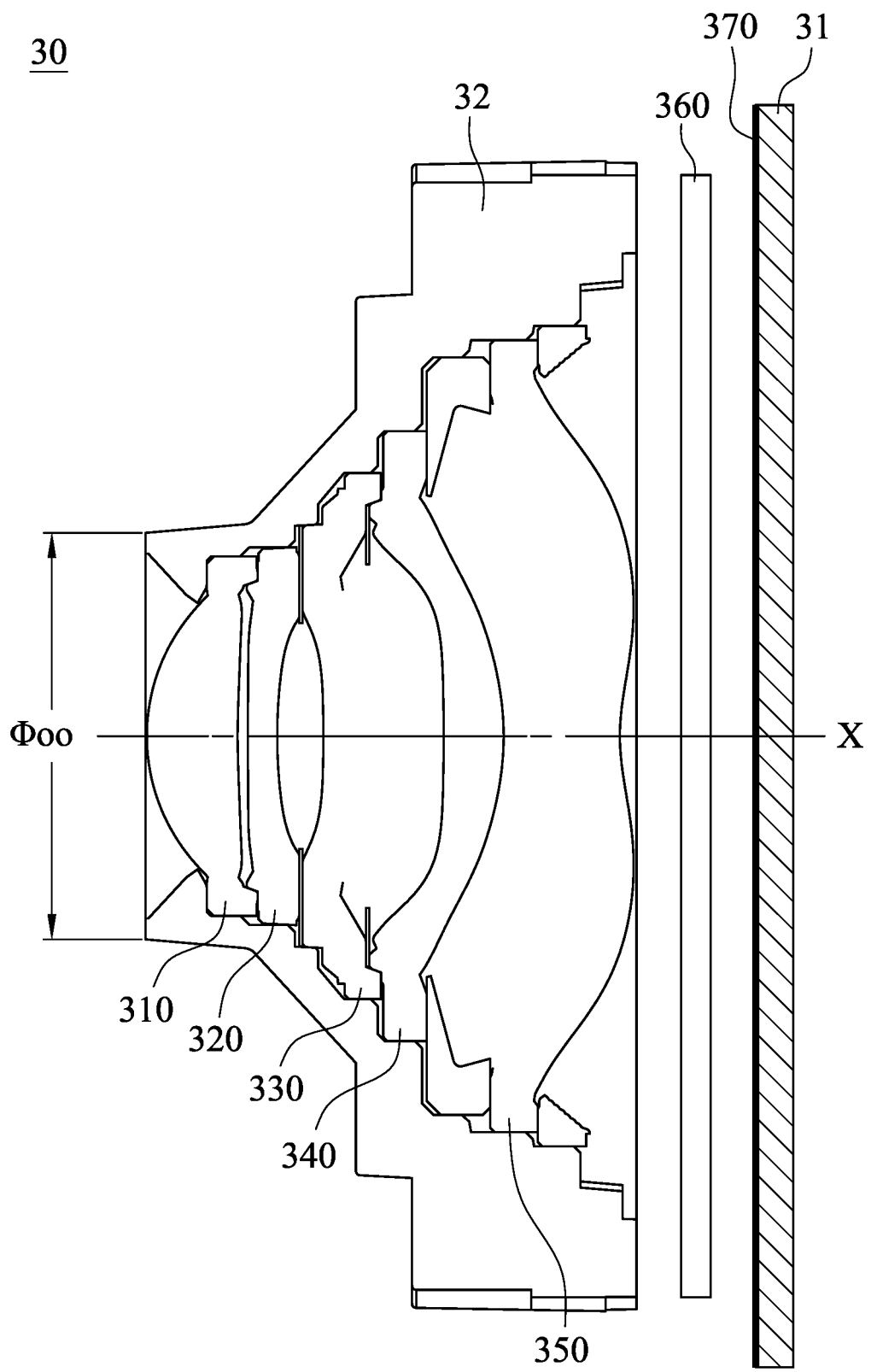
FIG. 3A is a schematic view of an electronic device according to the 3rd embodiment of the present disclosure.

FIG. 3A shows a schematic view of an electronic device 30 according to the 3rd embodiment of the present disclosure. In FIG. 3A, the electronic device 30 includes a camera module (its reference numeral is omitted) and an image sensor 31, wherein the image sensor 31 is disposed on an image surface 370 of the camera module. The camera module includes an imaging lens assembly (its reference numeral is omitted). The imaging lens assembly includes a plastic barrel 32, a lens element set (its reference numeral is omitted) and a filter 360, wherein the lens element set is disposed in the plastic barrel 32, and the filter 360 is disposed on the image end of the plastic barrel 32. The lens element set has an optical axis X and includes at least four lens elements. In the 3rd embodiment, the lens element set includes five lens elements, which are, from the object end to the image end are a first lens element, a second lens element, a third lens element 330, a fourth lens element 340 and a fifth lens element 350, wherein the first lens element is an object-side lens element 310, and the second lens element is an image-side lens element 320.

Figure 3B:
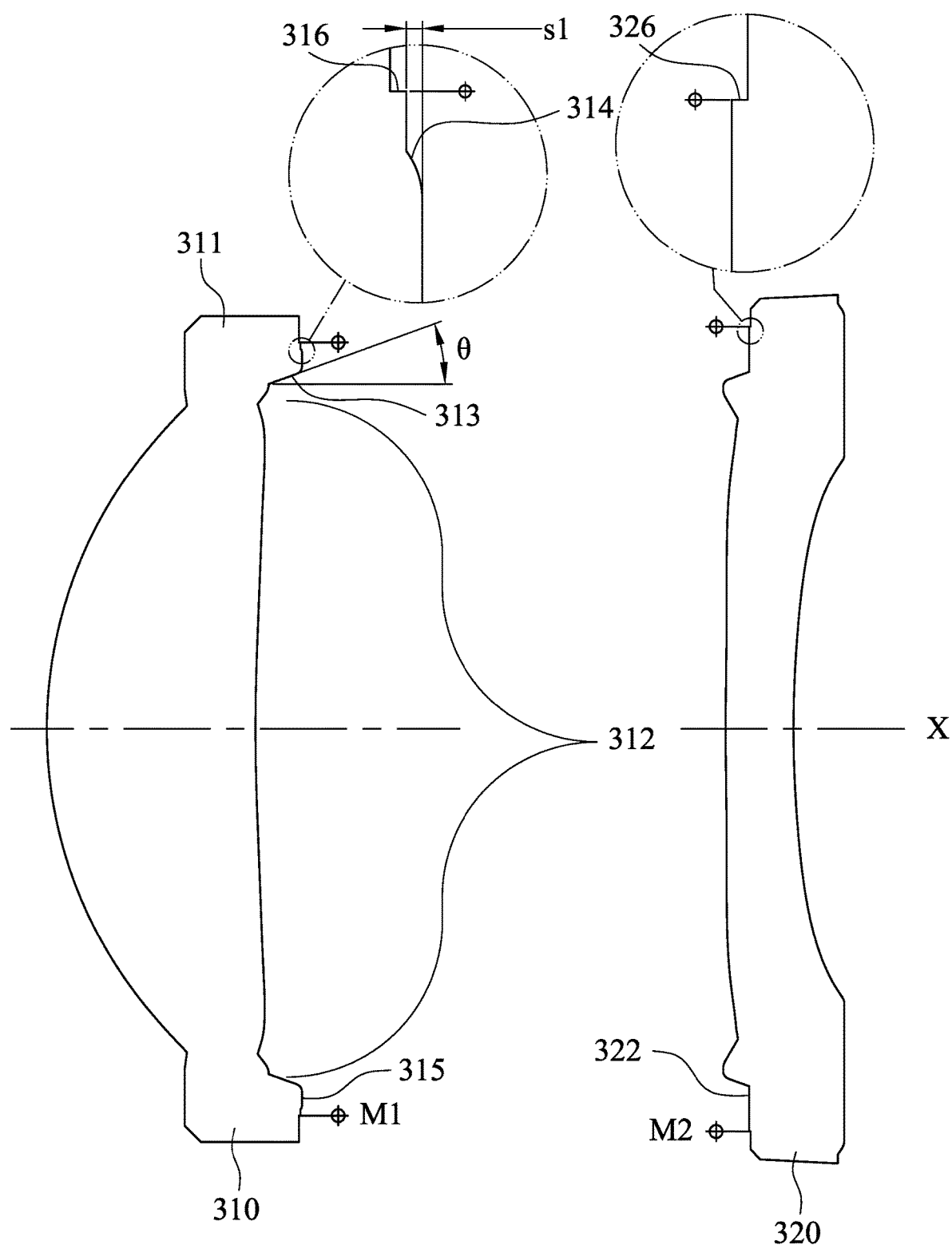
FIG. 3B is a schematic view of the object-side lens element and the image-side lens element of the electronic device according to the 3rd embodiment of FIG. 3A.
Figure 3C:
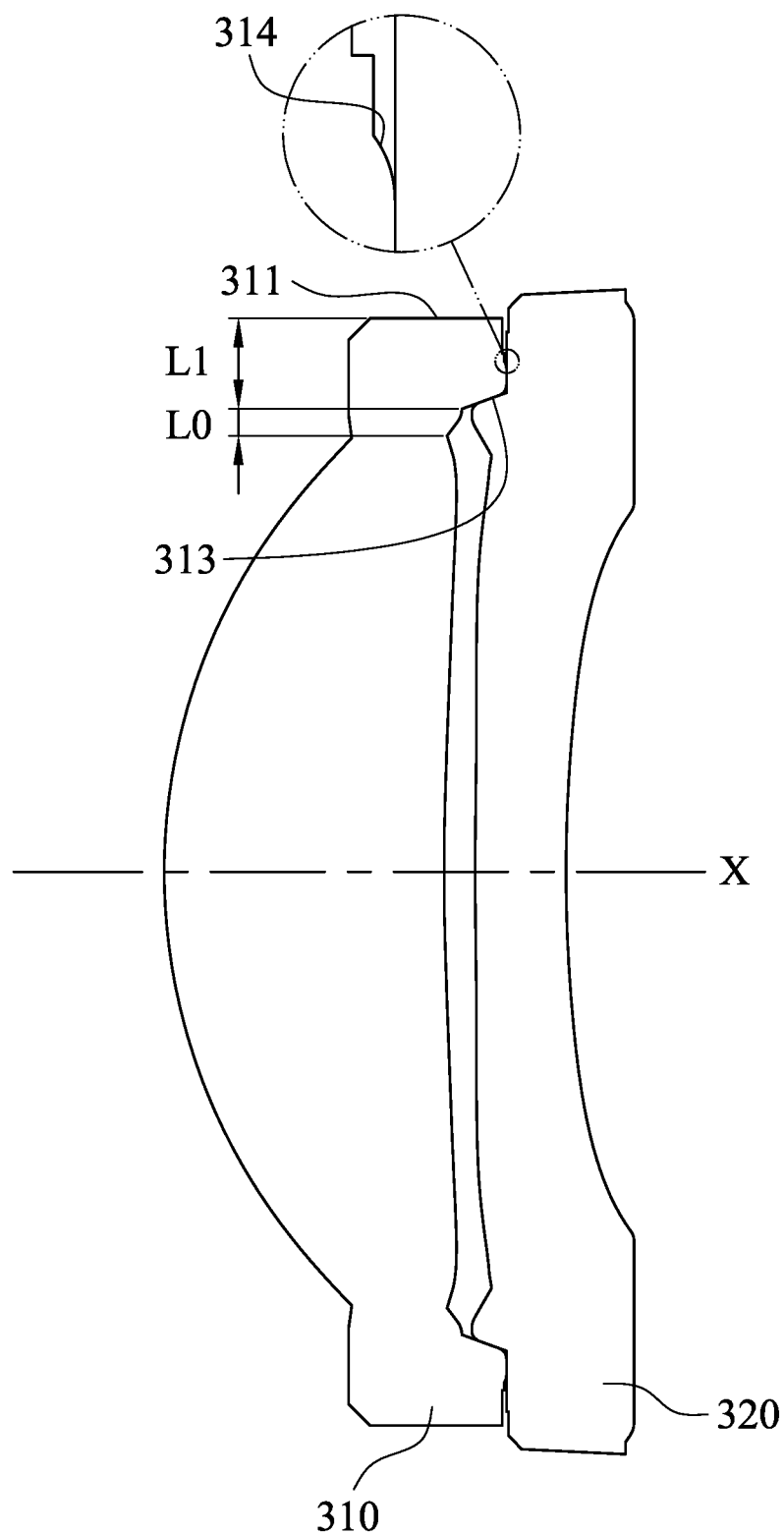
FIG. 3C is a schematic view of the connecting situation of the object-side lens element and the image-side lens element of the electronic device according to the 3rd embodiment of FIG. 3A.

FIG. 3B shows a schematic view of the object-side lens element 310 and the image-side lens element 320 of the electronic device 30 according to the 3rd embodiment of FIG. 3A, and FIG. 3C shows a schematic view of the connecting situation of the object-side lens element 310 and the image-side lens element 320 of the electronic device 30 according to the 3rd embodiment of FIG. 3A. In FIGS. 3B and 3C, the object-side lens element 310 and the image-side lens element 320 are connected with each other, and no lens element is disposed between the object-side lens element 310 and the image-side lens element 320. Furthermore, the lens element closest to the image end of the five lens elements (in the 3rd embodiment, which is the fifth lens element 350) has a thickness, and the thickness changes from small to large and then to small at a center of the lens element to an edge.

In detail, the object-side lens element 310 has an outer diameter surface 311 and an optical effective portion 312, wherein the outer diameter surface 311 is farther from the optical axis X than the optical effective portion 312 is from the optical axis X, and the outer diameter surface 311 of the object-side lens element 310 is directly contacted with the plastic barrel 32. The object-side lens element 310 includes a conical-aligning surface 313 and an annular recess structure 314, wherein the conical-aligning surface 313 can be disposed between the outer diameter surface 311 and the optical effective portion 312, and the annular recess structure 314 is located between the outer diameter surface 311 and the conical-aligning surface 313. The conical-aligning surface 313 is located on an image-side surface (its reference numeral is omitted) of the object-side lens element 310 and for coaxially aligning and connecting the image-side lens element 320. The conical-aligning surface 313 tapers toward the object end of the object-side lens element 310 along a direction from the outer diameter surface 311 to the optical effective portion 312. That is, a shrinking structure from the outer diameter surface 311 to the optical effective portion 312 is formed on the image-side surface of the object-side lens element 310 by the conical-aligning surface 313. Moreover, the conical-aligning surface 313 is a smooth circular surface.

Moreover, the object-side lens element 310 can further include an image-side receiving surface 315, and the image-side lens element 320 can further include an object-side receiving surface 322, wherein the image-side receiving surface 315 is connected with the object-side receiving surface 322, and the image-side receiving surface 315 is farther from the optical effective portion 312 than the conical-aligning surface 313 is from the optical effective portion 312. Therefore, the image quality and the assembling stability can be maintained.

According to FIG. 3B, the object-side lens element 310 can further include a parting line 316 having an annular step mark (its reference numeral is omitted) surrounding the optical effective portion 312, wherein the parting line 316 is located between the outer diameter surface 311 and the image-side receiving surface 315. In the 3rd embodiment, the disposing arrangement of the parting line 316 and other structures of the object-side lens element 310 is the same as the 1st embodiment, and will not be described again herein. Furthermore, the image-side lens element 320 can further include a parting line 326 having an annular step mark (its reference numeral is omitted).

According to FIGS. 3A, 3B and 3C, and the definition of the parameters of the Table 3 is same as the 1st embodiment, and will not be described again herein.

TABLE 3

| the 3rd embodiment | | | |
|---|---|---|---|
| L1 (mm) | 0.21 | s1 + s2 (mm) | — |
| L0 (mm) | 0.062 | θ (degree) | 20 |
| s1 (mm) | 0.005 | Φoo (mm) | 2.898 |
| s2 (mm) | — | p (um) | 0.8 |

4th Embodiment

Figure 4A:
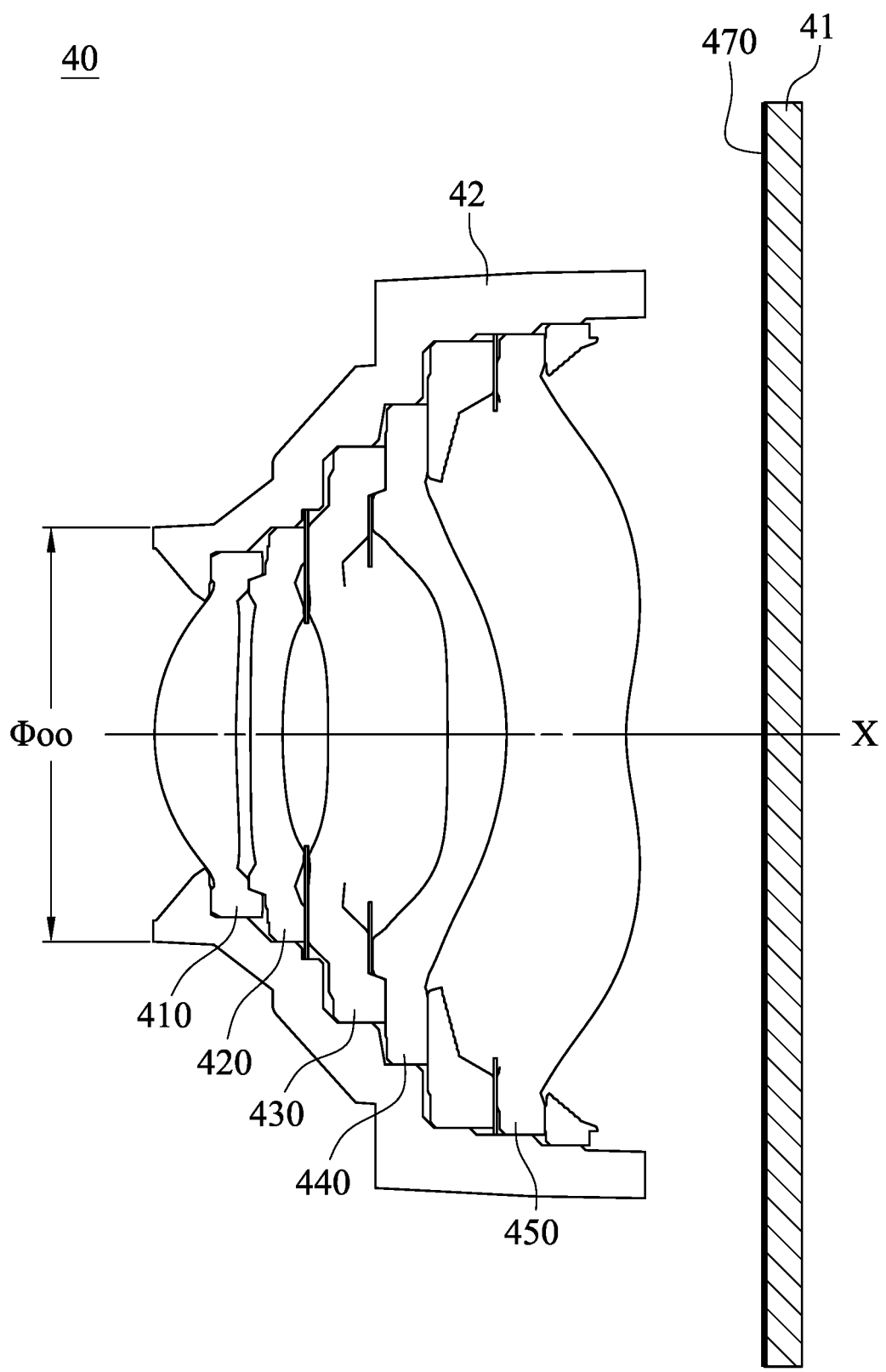
FIG. 4A is a schematic view of an electronic device according to the 4th embodiment of the present disclosure.

FIG. 4A shows a schematic view of an electronic device 40 according to the 4th embodiment of the present disclosure. In FIG. 4A, the electronic device 40 includes a camera module (its reference numeral is omitted) and an image sensor 41, wherein the image sensor 41 is disposed on the image surface 470 of the camera module. The camera module includes an imaging lens assembly (its reference numeral is omitted). The imaging lens assembly includes a plastic barrel 42 and a lens element set (its reference numeral is omitted), wherein the lens element set is disposed in the plastic barrel 42. The lens element set has an optical axis X and includes at least four lens elements. In the 4th embodiment, the lens element set includes five lens elements. The five lens elements from the object end to the image end are a first lens element, a second lens element, a third lens element 430, a fourth lens element 440 and a fifth lens element 450, wherein the first lens element is an object-side lens element 410, and the second lens element is an image-side lens element 420.

Figure 4B:
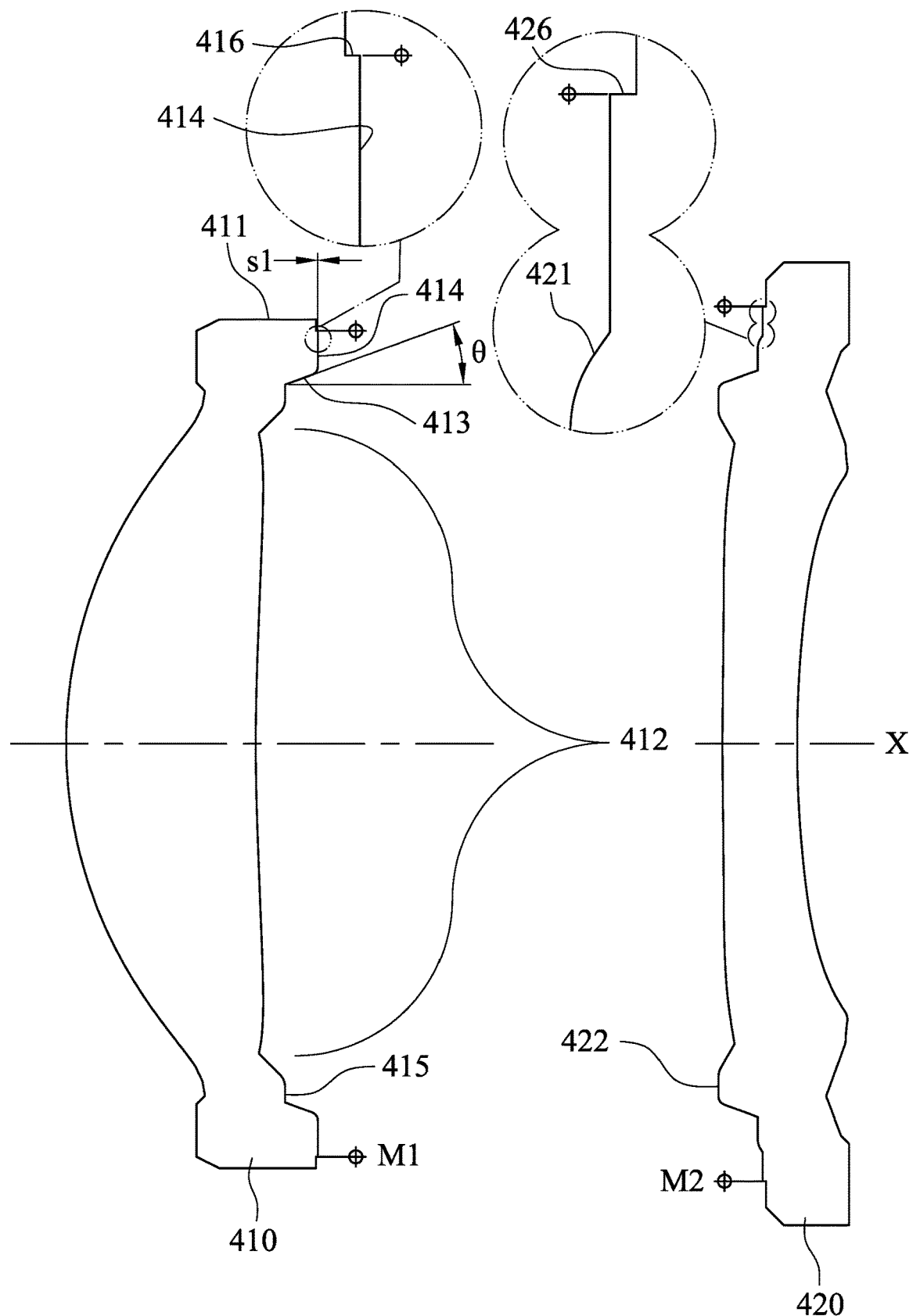
FIG. 4B is a schematic view of the object-side lens element and the image-side lens element of the electronic device according to the 4th embodiment of FIG. 4A.
Figure 4C:
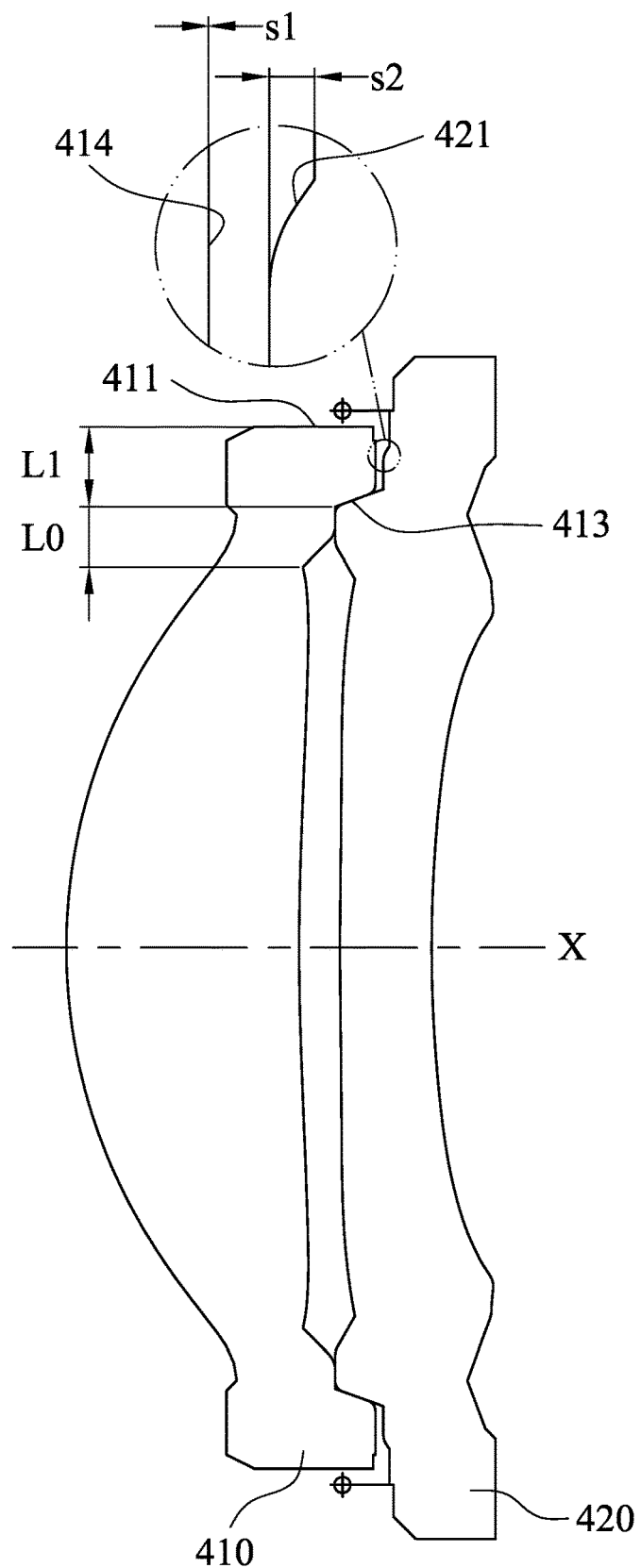
FIG. 4C is a schematic view of the connecting situation of the object-side lens element and the image-side lens element of the electronic device according to the 4th embodiment of FIG. 4A.

FIG. 4B shows a schematic view of the object-side lens element 410 and the image-side lens element 420 of the electronic device 40 according to the 4th embodiment of FIG. 4A, and FIG. 4C shows a schematic view of the connecting situation of the object-side lens element 410 and the image-side lens element 420 of the electronic device 40 according to the 4th embodiment of FIG. 4A. In FIGS. 4B and 4C, the object-side lens element 410 and the image-side lens element 420 are connected with each other, and no lens element is disposed between the object-side lens element 410 and the image-side lens element 420. Furthermore, the lens element closest to the image end of five lens elements (in the 4th embodiment, which is the fifth lens element 450) has a thickness, and the thickness changes from small to large and then to small at a center of the lens element to an edge.

In detail, the object-side lens element 410 has an outer diameter surface 411 and an optical effective portion 412, wherein the outer diameter surface 411 is farther from the optical axis X than the optical effective portion 412 is from the optical axis X, and the outer diameter surface 411 of the object-side lens element 410 is directly contacted with the plastic barrel 42. The object-side lens element 410 includes a conical-aligning surface 413 and an annular recess structure 414, wherein the conical-aligning surface 413 can be disposed between the outer diameter surface 411 and the optical effective portion 412, and the annular recess structure 414 is located between the outer diameter surface 411 and the conical-aligning surface 413. The conical-aligning surface 413 is located on an image-side surface (its reference numeral is omitted) of the object-side lens element 410 and for coaxially aligning and connecting the image-side lens element 420. The conical-aligning surface 413 tapers from the outer diameter surface 411 to a direction of the optical effective portion 412 toward the object end of the object-side lens element 410. That is, a shrinking structure from the outer diameter surface 411 to the optical effective portion 412 is formed on the image-side surface of the object-side lens element 410 by the conical-aligning surface 413. Moreover, the conical-aligning surface 413 is a smooth circular surface.

The image-side lens element 420 includes a first recess structure 421 facing the annular recess structure 414 of the object-side lens element 410, and a recess structure is formed on the position which is the annular recess structure 414 of the object-side lens element 410 corresponding to the first recess structure 421 of the image-side lens element 420.

Moreover, the object-side lens element 410 can further include an image-side receiving surface 415, and the image-side lens element 420 can further include an object-side receiving surface 422, wherein the image-side receiving surface 415 is connected with the object-side receiving surface 422, and the image-side receiving surface 415 is farther from the optical effective portion 412 than the conical-aligning surface 413 is from the optical effective portion 412. Therefore, the image quality and the assembling stability can be maintained.

According to FIG. 4B, the object-side lens element 410 can further include a parting line 416 having an annular step mark (its reference numeral is omitted) surrounding the optical effective portion 412, wherein the parting line 416 is located between the outer diameter surface 411 and the image-side receiving surface 415. In the 4th embodiment, the disposing arrangement of the parting line 416 and other structures of the object-side lens element 410 is the same as the 1st embodiment, and will not be described again herein. Furthermore, the image-side lens element 420 can further include a parting line 426 having an annular step mark (its reference numeral is omitted).

According to FIGS. 4A, 4B and 4C, and the definition of the parameters of the Table 4 is same as the 1st embodiment, and will not be described again herein.

TABLE 4 the 4th embodiment

| L1 (mm) | 0.2 | s1 + s2 (mm) | 0.015 |
|---|---|---|---|
| L0 (mm) | 0.15 | θ (degree) | 20 |
| s1 (mm) | 0 | Φoo (mm) | 2.95 |
| s2 (mm) | 0.015 | p (um) | 0.8 |

5th Embodiment

Figure 5A:
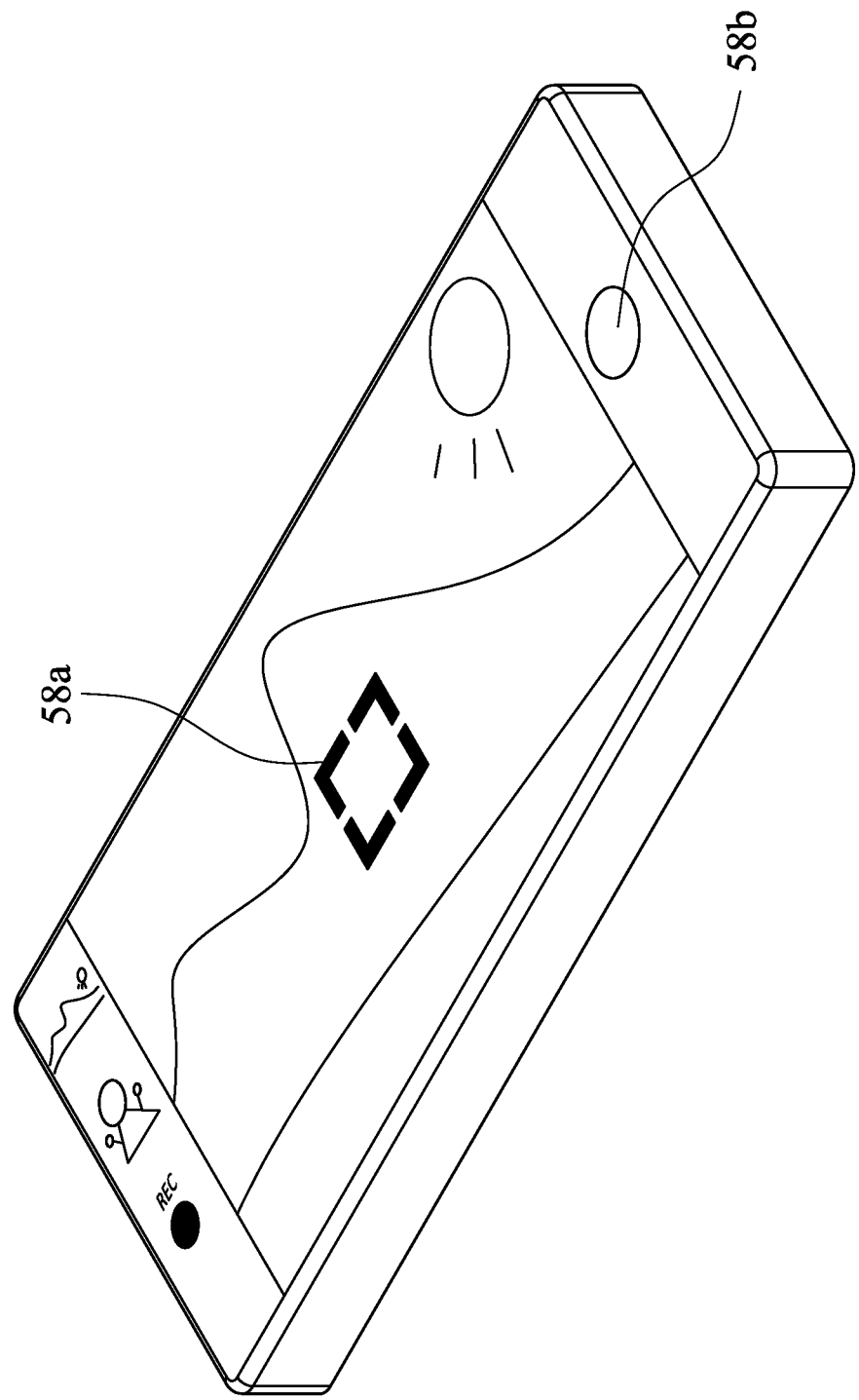
FIG. 5A is a schematic view of an electronic device according to the 5th embodiment of the present disclosure.
Figure 5B:
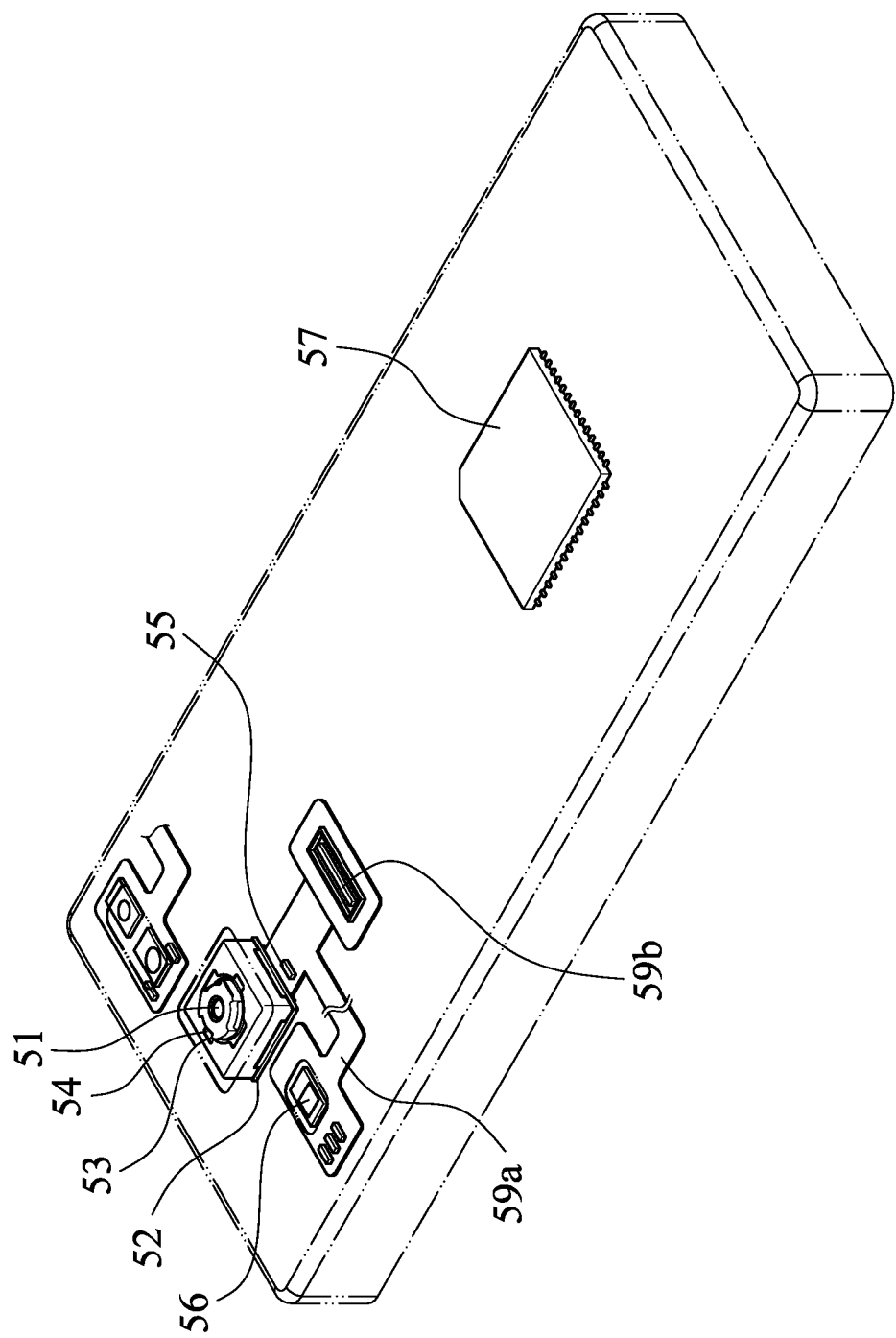
FIG. 5B is another schematic view of the electronic device according to the 5th embodiment.

FIG. 5A shows a schematic view of an electronic device 50 according to the 5th embodiment of the present disclosure, and FIG. 5B shows another schematic view of the electronic device 50 according to the 5th embodiment. In FIGS. 5A and 5B, the electronic device 50 according to the 5th embodiment is a smartphone. The electronic device 50 includes a camera module 51 and an image sensor 52 according to the present disclosure, wherein the camera module 51 can be any one of the camera modules of the electronic device of the aforementioned embodiments, which includes the imaging lens assembly, but is not limited thereto. The image sensor 52 is disposed on the image surface (not shown) of the camera module 51. Accordingly, the high demands to the mass production and appearances of the camera module of the current electronic device market can be satisfied.

Furthermore, the user activates the capturing mode via the user interface 58 of the electronic device 50, wherein the user interface 58 of the 5th embodiment can be a touch screen 58a, a button 58b, etc. At this moment, the camera module 51 collects imaging lights on the image sensor 52 and outputs electronic signals associated with images to an image signal processor (ISP) 57.

Figure 5C:
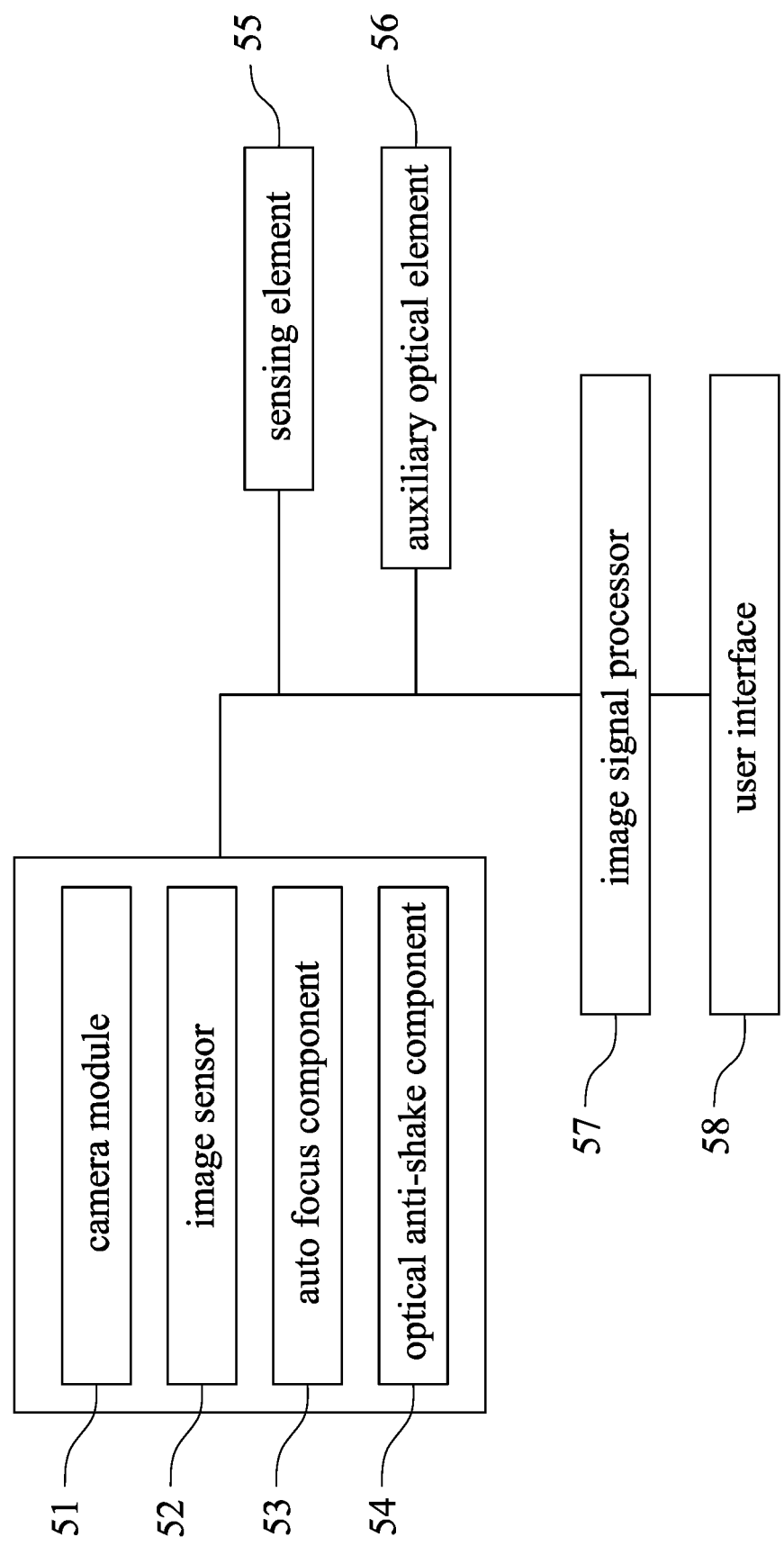
FIG. 5C is a block diagram of the electronic device according to the 5th embodiment.

FIG. 5C shows a block diagram of the electronic device 50 according to the 5th embodiment, in particular, the block diagram of the camera of the electronic device 50. In FIGS. 5A to 5C, the electronic device 50 can further include an auto focus component 53 and an optical anti-shake component 54 in response to the camera specifications of the electronic device 50. Moreover, the electronic device 50 can further include at least one auxiliary optical element 56 and at least one sensing element 55. The auxiliary optical element 56 can be a flash module, infrared distance measurement components, laser focus modules and modules for compensating for color temperatures. The sensing element 55 can have functions for sensing physical momentum and kinetic energies, such as an accelerator, a gyroscope, and a hall effect element, to sense shaking or jitters applied by hands of the user or external environments. As a result, the auto focus component 53 and the optical anti-shake component 54 disposed on the electronic device 50 can be used to obtain good image quality and facilitate the electronic device 50 according to the present disclosure to have a capturing function with multiple modes, such as taking optimized selfies, high dynamic range (HDR) with a low light source, 4K resolution recording, etc. Additionally, the user can visually see the captured image of the camera through the touch screen and manually operate the view finding range on the touch screen to achieve the auto focus function of what you see is what you get.

According to FIG. 5B, the camera module 51, the image sensor 52, the auto focus component 53, the optical anti-shake component 54, the sensing element 55 and the auxiliary optical element 56 can be disposed on a flexible printed circuitboard (FPC) 59a and electrically connected with the associated elements, such as an imaging signal processing element 57, via a connector 59b to perform a capturing process. Since the current electronic devices, such as smartphones, have a tendency of being light and thin, the way of firstly disposing the camera module, the imaging lens assembly and related elements on the flexible printed circuitboard and secondly integrating the circuit into the main board of the electronic device via the connector can satisfy the mechanical design of the limited space inside the electronic device and the layout requirements and obtain more margins. The auto focus function of the imaging lens module can be controlled more flexibly via the touch screen of the electronic device. In the 5th embodiment, the electronic device 50 can include a plurality of sensing elements 55 and a plurality of auxiliary optical elements 56. The sensing elements 55 and the auxiliary optical elements 56 are disposed on the flexible printed circuitboard 59a and at least one other flexible printed circuitboard (not labelled particularly) and electrically connected with the associated elements, such as an imaging signal processing element 57, via corresponding connectors to perform a capturing process. In other embodiments (not shown), the sensing elements and the auxiliary optical elements can also be disposed on the main board of the electronic device or carrier boards in other forms according to requirements of the mechanical design and the circuit layout.

Furthermore, the electronic device 50 can further include, but not be limited to, a display, a control unit, a storage unit, a random access memory, a read-only memory, or the combination thereof.

6th Embodiment

Figure 6:
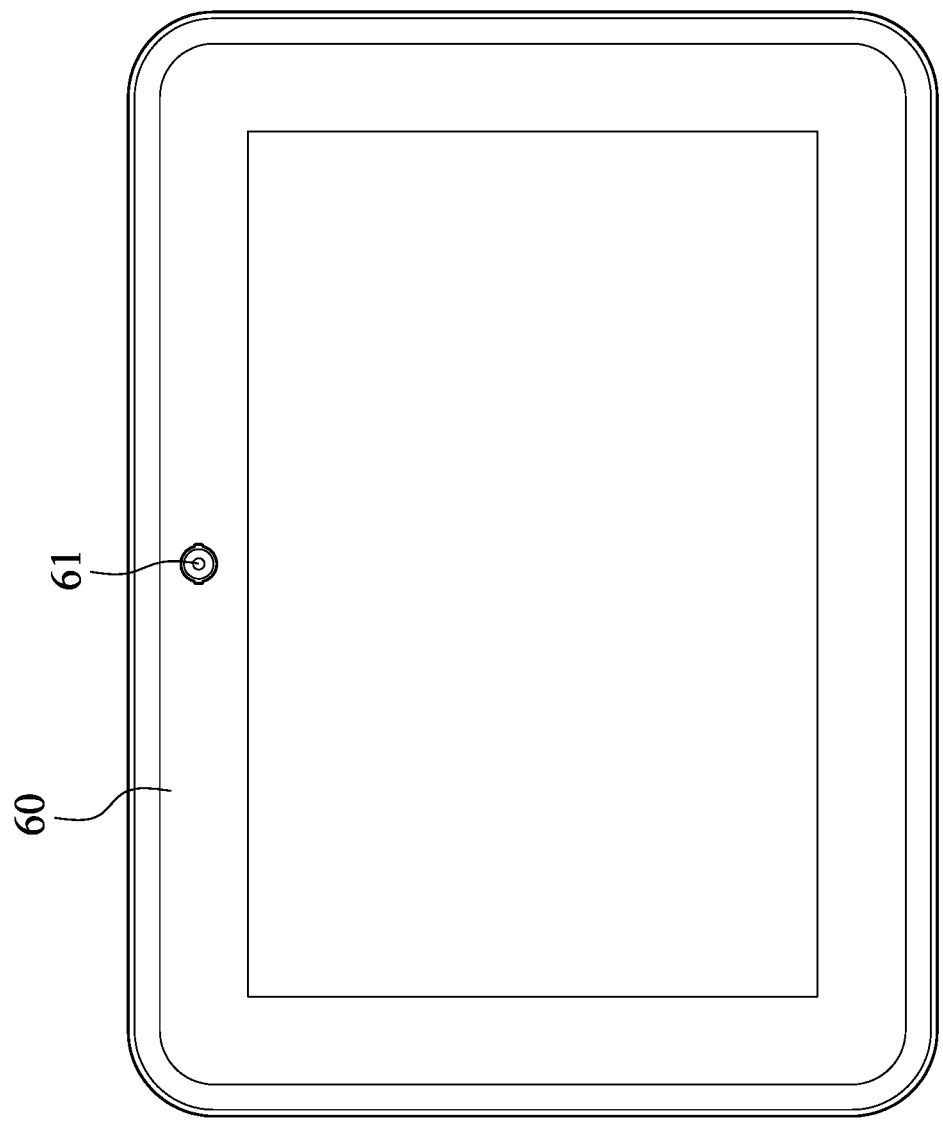
FIG. 6 is a schematic view of an electronic device according to the 6th embodiment.

FIG. 6 shows a schematic view of an electronic device 60 according to the 6th embodiment of the present disclosure. In FIG. 6, the electronic device 60 of the 6th embodiment is a tablet. The electronic device 60 includes a camera module 61 and an image sensor (not shown) according to the present disclosure, wherein the image sensor is disposed on the image surface (not shown) of the camera module 61, and the camera module 61 includes an imaging lens assembly (not shown) of the present disclosure.

7th Embodiment

Figure 7:
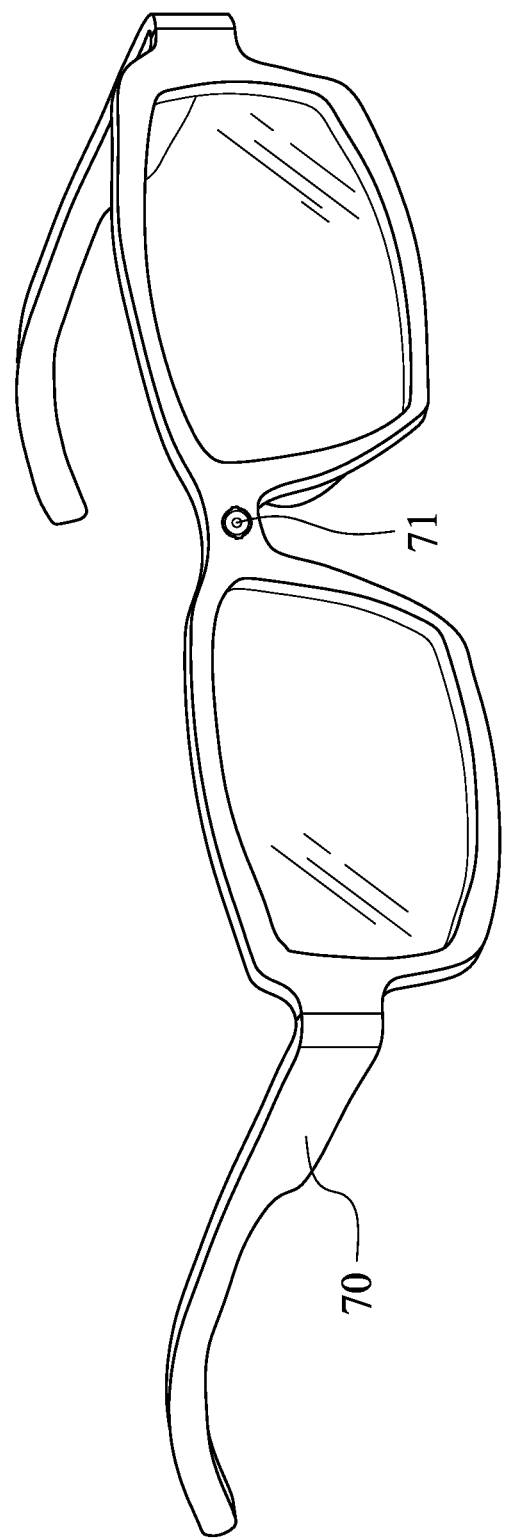
FIG. 7 is a schematic view of an electronic device according to the 7th embodiment.

FIG. 7 shows a schematic view of an electronic device 70 according to the 7th embodiment of the present disclosure. In FIG. 7, the electronic device 70 is a wearable device. The electronic device 70 includes a camera module 71 and an image sensor (not shown) according to the present disclosure, wherein the image sensor is disposed on the image surface (not shown) of the camera module 71, and the camera module 71 includes an imaging lens assembly (not shown) of the present disclosure.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly, comprising:
a plastic barrel; and
a lens element set disposed in the plastic barrel and having an optical axis, the lens element set comprising an object-side lens element and an image-side lens element, wherein the object-side lens element has an outer diameter surface and an optical effective portion, and comprises:
a conical-aligning surface located on an image-side surface of the object-side lens element and for coaxially aligning and connecting the image-side lens element;
wherein a minimum radial distance between a position of a minimum diameter of the conical-aligning surface and the outer diameter surface is L1, an outer diameter of the plastic barrel closest to an object end is $\Phi oo$, and the following conditions are satisfied:

$0.03$ mm$<L1<0.28$ mm; and $1.05$ mm$<\Phi oo<3.05$ mm.

2. The imaging lens assembly of claim 1, wherein the object-side lens element further comprises an image-side receiving surface, the image-side lens element comprises an object-side receiving surface, wherein the image-side receiving surface is connected with the object-side receiving surface, the image-side receiving surface is farther from the optical effective portion than the conical-aligning surface is from the optical effective portion.

3. The imaging lens assembly of claim 2, wherein the object-side lens element further comprises:
a parting line having an annular step mark surrounding the optical effective portion, wherein the parting line is located between the outer diameter surface and the image-side receiving surface.

4. The imaging lens assembly of claim 3, wherein the object-side lens element further comprises:
an annular recess structure located between the outer diameter surface and the conical-aligning surface, wherein a recess depth of the annular recess structure parallel to the optical axis is s1, and the following condition is satisfied:

$s1<0.015$ mm.

5. The imaging lens assembly of claim 3, wherein the object-side lens element further comprises an annular recess structure located between the outer diameter surface and the conical-aligning surface; and
the image-side lens element further comprises a first recess structure facing the annular recess structure of the object-side lens element;
wherein a recess depth of the annular recess structure parallel to the optical axis is s1, a recess depth of the first recess structure parallel to the optical axis is s2, and the following condition is satisfied:

$0.005$ mm$<s1+s2<0.035$ mm.

6. The imaging lens assembly of claim 3, wherein the object-side lens element further comprises an annular recess structure located between the outer diameter surface and the conical-aligning surface; and
the image-side lens element further comprises a first recess structure facing the annular recess structure;
wherein a recess depth of the annular recess structure parallel to the optical axis is s1, a recess depth of the first recess structure parallel to the optical axis is s2, and the following condition is satisfied:

$s1<s2$.

7. The imaging lens assembly of claim 3, wherein the minimum radial distance between the position of the minimum diameter of the conical-aligning surface and the outer diameter surface is L1, and the following condition is satisfied:

$0.03$ mm$<L1\leq0.23$ mm.

8. The imaging lens assembly of claim 2, wherein a minimum radial distance between the position of the minimum diameter of the conical-aligning surface and the optical effective portion is L0, and the following condition is satisfied:

$$0.2\ mm<L0.$$

9. The imaging lens assembly of claim 2, wherein the lens element set comprises at least four lens elements, the at least four lens elements comprise the object-side lens element and the image-side lens element, wherein a lens element of the at least four lens elements closest to an image end has a thickness, the thickness changes from small to large and then to small at a center of the lens element to an edge of the lens element.

10. The imaging lens assembly of claim 5, wherein the recess depth of the annular recess structure parallel to the optical axis is s1, the recess depth of the first recess structure parallel to the optical axis is s2, and the following condition is satisfied:

$$0.005\ mm<s1+s2<0.02\ mm.$$

11. The imaging lens assembly of claim 5, wherein the recess depth of the annular recess structure parallel to the optical axis is s1, the recess depth of the first recess structure parallel to the optical axis is s2, and the following condition is satisfied:

$$s1<s2.$$

12. The imaging lens assembly of claim 11, wherein the recess depth of the annular recess structure parallel to the optical axis is s1, and the following condition is satisfied:

$$s1<0.015\ mm.$$

13. The imaging lens assembly of claim 12, wherein the recess depth of the annular recess structure parallel to the optical axis is s1, and the following condition is satisfied:

$$s1<0.01\ mm.$$

14. The imaging lens assembly of claim 6, wherein the recess depth of the annular recess structure parallel to the optical axis is s1, and the following condition is satisfied:

$$s1<0.01\ mm.$$

15. The imaging lens assembly of claim 7, wherein the object-side lens element further comprises:
an annular recess structure located between the outer diameter surface and the conical-aligning surface, wherein a recess depth of the annular recess structure parallel to the optical axis is s1, and the following condition is satisfied:

$$s1<0.015\ mm.$$

16. The imaging lens assembly of claim 15, wherein the image-side lens element further comprises a first recess structure facing the annular recess structure of the object-side lens element;
wherein the recess depth of the annular recess structure parallel to the optical axis is s1, a recess depth of the first recess structure parallel to the optical axis is s2, and the following condition is satisfied:

$$0.005\ mm<s1+s2<0.02\ mm.$$

17. The imaging lens assembly of claim 7, wherein the object-side lens element further comprises an annular recess structure located between the outer diameter surface and the conical-aligning surface; and
the image-side lens element further comprises a first recess structure facing the annular recess structure of the object-side lens element;
wherein a recess depth of the annular recess structure parallel to the optical axis is s1, a recess depth of the first recess structure parallel to the optical axis is s2, and the following condition is satisfied:

$$0.005\ mm<s1+s2<0.035\ mm.$$

18. The imaging lens assembly of claim 17, wherein the recess depth of the annular recess structure parallel to the optical axis is s1, the recess depth of the first recess structure parallel to the optical axis is s2, and the following condition is satisfied:

$$s1<s2.$$

19. The imaging lens assembly of claim 7, wherein the object-side lens element further comprises an annular recess structure located between the outer diameter surface and the conical-aligning surface; and
the image-side lens element further comprises a first recess structure facing the annular recess structure of the object-side lens element;
wherein a recess depth of the annular recess structure parallel to the optical axis is s1, a recess depth of the first recess structure parallel to the optical axis is s2, and the following condition is satisfied:

$$s1<s2.$$

20. The imaging lens assembly of claim 19, wherein the recess depth of the annular recess structure parallel to the optical axis is s1, the recess depth of the first recess structure parallel to the optical axis is s2, and the following condition is satisfied:

$$0.005\ mm<s1+s2<0.02\ mm.$$

21. The imaging lens assembly of claim 7, wherein a minimum radial distance between the position of the minimum diameter of the conical-aligning surface and the optical effective portion is L0, and the following condition is satisfied:

$$0.2\ mm<L0.$$

22. The imaging lens assembly of claim 7, wherein the lens element set comprises at least four lens elements, the at least four lens elements comprise the object-side lens element and the image-side lens element, wherein a lens element of the at least four lens elements closest to an image end has a thickness, the thickness changes from small to large and then to small at a center of the lens element to an edge of the lens element.

23. The imaging lens assembly of claim 1, wherein an angle between the conical-aligning surface and the optical axis is θ, and the following condition is satisfied:

$$2\ degrees<\theta<30\ degrees.$$

24. A camera module, comprising:
the imaging lens assembly of claim 1.

25. An electronic device, comprising:
the camera module of claim 24; and
an image sensor disposed on an image surface of the camera module.

26. The electronic device of claim 25, wherein a pixel size of the image sensor is p, and the following condition is satisfied:

$$0.1\ um<p<0.95\ um.$$

* * * * *